United States Patent Office 2,928,725
Patented Mar. 15, 1960

2,928,725

PREPARATION OF FERROUS SULFATE MONOHYDRATE SUSPENSIONS

William Hughes, Fairfield, Stockton-on-Tees, England, assignor to British Titan Products Company Limited, Billingham, Durham County, England No Drawing. Application April 27, 1959
Serial No. 808,961

Claims priority, application Great Britain May 20, 1955

20 Claims. (Cl. 23—126)

This invention is for improvements in or relating to the preparation of suspensions, and has particular reference to a process for preparing a concentrated aqueous suspension of ferrous sulfate monohydrate. The suspension produced by the process of the invention is particularly useful for obtaining ferrous sulfate in a substantially dry, free-flowing form, the moisture content being preferably not greater than is represented by $FeSO_4:2H_2O$, by subjecting the suspension to drying and more especially spray-drying. The present application is a continuation-in-part of application Serial No. 583,942, filed May 10, 1956, and now abandoned, and of Serial No. 746,639, filed July 7, 1958.

It is an object of the present invention to provide an improved process for the preparation of a concentrated aqueous suspension of ferrous sulfate monohydrate suitable for spray-drying from relatively highly hydrated ferrous sulfates such as copperas.

It is also an object of the invention to provide an improved process for the conversion of the more highly hydrated forms of ferrous sulfate into the substantially dry form, containing not more than about 2.0 molecules of $H_2O$ per molecule of $FeSO_4$.

It is a further object of the invention to provide improved methods for avoiding the problems incidental to the heating of hydrated forms of ferrous sulfate and solutions and suspensions thereof.

Another object of the invention is to provide improved methods for avoiding the corrosion problems incidental to the drying of commercially obtained copperas or other forms of ferrous sulfate having free acidity.

Commercial copperas which consists mainly of the heptahydrate, but which may also contain minor amounts of the pentahydrate and the tetrahydrate and be dehydrated by direct heating. At normal pressures the monohydrate is obtained by heating to a temperature of about 200° C., a temperature of about 300° C. or even higher being required to obtain complete dehydration. This dehydration to the monohydrate or even the anhydrous salt can be accomplished fairly readily on the small scale but on the commercial scale considerable practical difficulty is encountered with the usual equipment due to the fact that copperas tends to melt in its own water of crystallization with the production of a glassy scale on the heat transfer surfaces and the walls of whatever form of equipment is used which is very difficult to remove or prevent. Even where various designs of rotary driers have been used the crystals tend to ball up and set into lumps which are discharged still containing a high proportion of water.

The monohydrate has also been prepared by the spray-drying of an aqueous solution of ferrous sulfate in a current of heated air or other gas. This method while producing a satisfactory product is, however, unsatisfactory on account of the comparatively large amount of water required to effect solution to produce a suitable feed for supply to the spray-drying equipment. Such a solution will normally contain more water than is equivalent to the proportions represented by $$FeSO_4:16.6H_2O$$

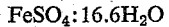

approximating to the maximum saturation concentration of ferrous sulfate. In drying to the monohydrate it follows that the proportion of water to be evaporated per mole of $FeSO_4$ is more than 15.6.

It has now been discovered that a concentrated aqueous suspension of ferrous sulfate monohydrate may be prepared in which the total water content combined and free can be as low with respect to the ferrous sulfate present as is represented by the relationship $$FeSO_4.7.0H_2O$$

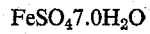

The ferrous sulfate monohydrate in substantially dry form can be recovered by evaporation of the free water content of the slurry, preferably by spray-drying.

According to the present invention, there is provided a process for preparing an aqueous suspension of ferrous sulfate monohydrate from more highly hydrated ferrous sulfate which comprises adding the more highly hydrated ferrous sulfate with agitation to water, the resulting suspension being maintained at a temperature between that at which the monohydrate becomes the stable phase (about 64° C.) and its boiling point until the concentration of ferrous sulfate in the suspension lies between the saturation concentration of ferrous sulfate at the temperature of the suspension and the concentration represented by the relationship $$FeSO_4:7.0H_2O$$

The more highly hydrated ferrous sulfate preferably comprises copperas.

The process further comprises adding additional quantities of the more highly hydrated ferrous sulfate and of water, if necessary, to the aqueous suspension of ferrous sulfate monohydrate while maintaining the temperature of the suspension between about 64° C. and its boiling point and the concentration of ferrous sulfate in the suspension between the maximum saturation concentration of ferrous sulfate ($FeSO_4:16.6H_2O$) and the concentration represented by the relationship $FeSO_4:7.0H_2O$.

The temperature of the suspension is suitably maintained between 65° and 85° C.

In a preferred embodiment of the invention the concentration of ferrous sulfate in the suspension is maintained within the range represented by the relationship $FeSO_4:7.0H_2O$ to $FeSO_4:9.0H_2O$. However, any concentration greater than that of the maximum saturation

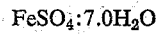

concentration of ferrous sulfate in an aqueous solution ($FeSO_4:16.6H_2O$) and up to about $FeSO_4:16.5H_2O$ offers economic advantages as compared to the drying of solutions as conventionally prepared.

The ferrous sulfate monohydrate in the suspension may be recovered by evaporation of the uncombined water. It is not essential that the recovered ferrous sulfate monohydrate should be completely dry. A product which is free flowing is attained provided the total moisture present is not higher than is represented by $FeSO_4:2.5H_2O$. It is preferred, however, that the total moisture should not be greater than is represented by $FeSO_4:2H_2O$. While spray-drying is particularly contemplated, the monohydrate slurry produced in accordance with this invention may be dried by other means, e.g., by pouring onto a hot plate and subsequently drying, preferably at a relatively low temperature, or onto a traveling belt which passes through a drying oven.

In carrying out the invention, water may be heated to a temperature between 65° C. and the boiling point in a suitable vessel fitted with a mechanical agitator and then copperas is added until the overall concentration of ferrous sulfate in the total water present is within the range represented by $FeSO_4:7.0H_2O$ to $FeSO_4:9H_2O$ and thereafter copperas and if necessary a small amount of water are continually or intermittently added to maintain this concentration while the suspension is continuously agitated and its temperature kept within the required range.

A portion of the suspension is continuously or intermittently discharged from the vessel and passed directly to a drier which because of the nature of the suspension is preferably a spray-drier. It is important that the suspension if not passed directly to the drier, should be stored in a vessel where it is continuously agitated and the temperature maintained above 60° C., otherwise it will be set to a solid mass.

While heat may be applied externally to a vessel containing the solution or suspension, or may be applied through immersed coils or by the use of calandria or other devices by which steam or hot gases are used for indirect heating, there may be some tendency for scale formation on the heating surfaces thereby imparting a resistance to the transfer of heat. Also, the nature of the solution or suspension may preclude the use of material for the construction of the vessel suitable for the application of external heat. The type of vessel which is usually employed is one which is constructed of steel lined with rubber and acid-resisting brick, and it will be appreciated that vessels of such construction are not readily adapted to be heated by external means.

An improvement or modification of the broad invention as set forth above which avoids these problems consists in maintaining the required temperature by the use of live steam. Accordingly, as the process of producing suspensions according to the present invention proceeds, the higher hydrate such as copperas will be progressively added in an amount correlated to the water introduced by the live steam so as to maintain the overall content of ferrous sulfate in the suspension between the saturation concentration at the temperature of the suspension and the overall content represented by the relationship $FeSO_4:7.0H_2O$.

The overall content of iron sulfate may be slightly greater than that just been indicated but drying, particularly spray-drying, will be rendered unduly difficult if the overall content were greater than that represented by the relationship $FeSO_4:6.5H_2O$.

The present process may be operated batchwise but it is preferred, so as to provide a regular feed to the drier, to operate continuously or semi-continuously with the employment of a preparation vessel and a storage vessel, which vessels may be tanks made of mild steel lined with rubber and acid-resisting tiles. From the preparation vessel there will be a conduit through which the prepared suspension is passed to a storage vessel which delivers the suspension to the drier. Both vessels will be fitted with agitators and with injectors for the admission of live steam.

In the preferred method of operation there is added at the start to the preparation vessel a relatively small amount of water and then the steam is turned on. When the temperature has reached at least 60° C., and preferably about 80° C., copperas is added and the temperature is maintained until the amount of copperas added is such that the composition of the total content of the vessel is equivalent to that represented by $FeSO_4:8.5-11H_2O$. Pumping of the prepared suspension to the storage vessel is then commenced and further copperas is added continuously or intermittently into the preparation vessel, steaming being continued to control the temperature and composition of the suspension within the preferred working range.

The rate of conversion to ferrous sulfate monohydrate of the fresh copperas added to the suspension depends on the particle size and shape of the crystals and on the temperature maintained. Copperas as recovered on the commercial scale from acid solutions of ferrous sulfate consists for the most part of diamond-shaped platelets varying from 0.1 to 4 mms. in size and of a thickness varying from 0.01 to 0.3 mms. or more. Copperas prepared by vacuum crystallization methods contains a larger amount of finer crystals in the range 0.5 to 2 mms. than does copperas crystallized at atmospheric pressure. At 80° C., atmospheric pressure-crystallized copperas requires a retention time of about two hours to be completely converted to monohydrate while for vacuum-crystallized copperas the times is one and a half hours. At 90° C. the times are reduced to one and a half hours and one hour respectively. At lower temperatures, the time required is larger and at higher temperatures, somewhat reduced. Thus the retention time required within the range 65° C. to the boil varies between about six hours and half an hour and within the preferred temperature range of 65° to 85° C. varies from about six hours to one hour. The product consists of a cream-colored, homogeneous, free-flowing suspension. The presence of unconverted copperas crystals is shown very simply by dipping a glass rod or similar instrument into the suspension when they are apparent as grit or particles in the suspension flowing from the rod. The retention time required under the various conditions is judged by continuing the heating until uniform suspension described above is obtained.

At 80° C. slurries have been prepared with a concentration maintained within the range $FeSO_4:7.0H_2O$ to $FeSO_4:7.35H_2O$ with a viscosity low enough for easy stirring and when poured the slurry is smooth and homogeneous.

The spray-dried product is suitable as a feed to a reactor for the production of sulfur dioxide either alone or in conjunction with pyrites.

Following is a description by way of example of methods of carrying the invention into effect:

*Example 1*

80 mls. of water were placed in a 600 ml. beaker fitted with a paddle stirrer and 100 gms. of copperas were added and the temperature raised to 85° C. A further 400 gms. of copperas were then slowly added, the temperature of 85° C. being maintained. Analysis of the suspension at this stage revealed a composition equivalent to $FeSO_4:9.2H_2O$. The suspension was held at this temperature with continuous stirring and allowing water to evaporate until the composition of the suspension was equivalent to $FeSO_4:7.16H_2O$.

At this point water was added to counteract further evaporation, the rate of addition for this purpose having been calculated from previous analyses, and an additional 400 gms. of copperas were slowly added without apparently altering the viscosity. Analysis at intervals during the addition of the second 400 gms. of copperas revealed an almost constant composition of the suspension varying only between 7.25 and $7.35H_2O$.

The cream-colored suspension produced was free-flowing and homogeneous.

*Example 2*

A spray drier was used to dry a number of 5 kilo batches of slurry prepared in a manner similar to Example 1.

The spray drier used had a diameter of 8 ft. with an evaporative capacity of about 80 lbs. per hour. In the experiment, the inlet temperature of the hot air used was 350° C. and the outlet temperature 180° C. The slurry was fed at the rate of 218 lbs. per hour and two samples of the dried product analyzed $FeSO_4:1.4H_2O$ and $FeSO_4:1.6H_2O$.

While spray-drying is the preferred procedure, it is possible to dry the slurry of the invention by other methods. Thus, the monohydrate slurry may be poured onto a hot plate and dried in an oven at temperatures of 100° to 450° C. or higher or under vacuum, at temperatures substantially below 100° C. The monohydrate slurry, after preparation, may be poured or otherwise distributed onto a metal plate in the form of a relatively thin layer and in this form may be exposed to heat by transfer into a drying oven. A layer of slurry about one-quarter inch thick has been successfully used, but it will be understood that layers of different thickness may also be employed.

In a continuous operation, the slurry may be poured onto a moving, preferably metal belt, which is traveling through a heated oven or furnace to effect the drying. After drying, the material may be easily removed from the belt by passage of the belt over a roller and, if necessary, additionally with the aid of a scraping device.

Example 3

A mild steel tank, lined with rubber and acid-resisting brick and of 20 cubic feet capacity, is filled to a depth of about one foot with 40 gallons of water. The tank is fitted with a gate agitator and with a rubber-covered steel injector for admitting live steam. The steam is turned on to raise the temperature of the water to 80° C. and copperas is then added at the rate of 8 cwts. per hour, the steam being thereafter controlled to maintain the temperature of the slurry at 80° C. With the addition of copperas at said rate, the rate of introduction of steam averages 112 lbs. per hour. Slurry from this main tank when it has reached a predetermined level corresponding to about 15 cubic feet of slurry giving an average retention time of the copperas feed in the tank of one and a half hours, is pumped, or allowed to overflow, to a holding tank of similar construction to that of the main tank but having a capacity of about 30 cubic feet. From the holding tank the slurry is pumped to a spray-drying equipment and after six hours the composition of the homogeneous slurry in the holding tank will be equivalent to $FeSO_4:9.3H_2O$. As the process is continued the effect of the initial water on the composition of the slurry will be negligible and a fairly steady, overall content of iron sulfate equivalent to $FeSO_4:8.8H_2O$ will be achieved during the next 18 hours.

Copperas suitable for use in the invention is frequently crystallized from solutions containing acid, e.g., from pickled liquors and also from solutions containing titanium sulfate and other solutions of iron. It normally crystallizes as $FeSO_4:7H_2O$ although as previously explained, due to the drying and sometimes due to the presence of impurities including metal sulfates, sulfuric acid or the like, it may have varying proportions of water above or below this proportion. Normally, when crystallized from acid solution, it may contain up to 0.25% of free sulfuric acid although even this might be increased when other impurities and particularly titanium sulfate impurities are present since such metals are very weak bases and render solutions obtained therefrom highly acidic.

Although the residual acidity normally encountered in these source materials is usually insufficient to provide an adverse effect on the dried product, it may tend to produce corrosive effects on metal equipment through which it is conveyed. For this reason, it may be desired to neutralize the acidity of the copperas or, alternatively, of the monohydrate slurry produced therefrom, with a relatively small portion of alkali, i.e., an amount equivalent to the amount of free acid initially estimated to be present in the copperas. On exposure to air, under the conditions of the process, there is very little tendency for ferrous sulfate in an acid medium to oxidize to form free sulfuric acid. However, oxidation is prone to take place more rapidly under neutral conditions. Accordingly, in order to maintain the neutralized slurry in the neutral state during the period of preparation of the monohydrate and the drying thereof, it is necessary to avoid oxidation during this period of operation. This may be accomplished either by ensuring that the surface of the slurry exposed to the atmosphere is negligible in comparison with the quantity of monohydrate in process or by operating in an atmosphere which is deficient in oxygen. For example, the surface of the slurry in the reaction and storage vessels may be blanketed with an inert gas, such as nitrogen.

For example, copperas, which is frequently available in commerce, particularly as a by-product from the industries, referred to above, when dissolved in water, especially at the concentrations equivalent to that of the monohydrate, may produce a solution with a pH of the order of 1.8 and an acidity of about 0.15% calculated as $H_2SO_4$ on the copperas content. The pH may be elevated and the acidity reduced by the addition of any of the well-known alkalies, e.g., alkaline reacting substances such as hydrates, oxides and in some cases, carbonates of the alkalies and alkaline earths including magnesium. It could also be derived from certain basic compounds such as ammonia, but these may not be desirable in the subsequent decomposition of the monohydrate after drying. Other oxidic substances may also be used although those of the alkali, alkaline earths and magnesium group are preferred.

The amount of alkali added to the monohydrate slurry may be equivalent to the free acid as given above, or it may be in excess of this quantity. When, for instance, the equivalent quantity of alkali is added, a pH value of about 4 is obtained; with double the quantity of alkali, a pH of 5 may be reached. Normally, the equivalent amount suffices to overcome the problem of the corrosive effect of the slurry but where rapid oxidation is anticipated, i.e., when the slurry is strongly exposed, for instance, to air, it may be desirable to have alkali in excess in order to take up the free acid generated by oxidation during the period of exposure. Thus, for instance, a copperas normally having an acidity of 0.15% may increase when converted into a monohydrate slurry to an acidity of 0.25-3 in a matter of 5-6 hours and it is normally desirable to have an excess sufficient to overcome such oxidation. The alkaline-reacting material which will effect this change in pH may be added either admixed with the copperas beforehand or to the monohydrate slurry after preparation or at any desirable temperature interval. It may be added directly or it may be previously formed into an aqueous slurry or solution prior to admixture. If the alkaline reagent should be ammonia, it could either be admitted as a gas or in aqueous solution. The term "neutralize" as applied to this operation of producing monohydrate slurry refers to reducing the acidity to a pH not exceeding 4 to 5.

As indicated above and particularly when the mixture is at an elevated temperature, it is preferable that after addition of the alkali, the material should be protected as much as possible from atmospheric oxidation, at least prior to the drying operation. If an excess of alkali over and above the equivalent to neutralize the original acid of the copperas is employed, there is a tendency for the iron to be precipitated as ferrous hydroxide and for a corresponding production of a sulfate of the alkaline reagent, which sulfate will not so readily decompose in the subsequent recovery of sulfur values.

The following is an example of one way of conducting the neutralization:

Example 4

A sample of copperas derived as a by-product in the manufacture of titanium dioxide by the sulfate process was found to contain 0.14% $H_2SO_4$ on the copperas assumed to be $FeSO_4:7H_2O$. 700 grams of this copperas was formed into a monohydrate slurry, as described in Example 1, with an overall composition of $FeSO_4:7H_2O$. After the slurry had stood for a period of 5 hours, it was found that the acidity had increased to 0.24%. To this slurry was added 11 ccs. of sodium carbonate solution having a concentration of 200 g./l., thus producing a pH of 4.2. The corrosive effect of this slurry was examined by transferring the slurry to a flask having a suitable agitator and suspending below the surface of the slurry a strip of stainless steel. The slurry was maintained at 80° C. for a period of 100 hours, the surface being protected by an inert atmosphere. It was found that the corrosion of the stainless steel was much reduced as compared with a strip similarly exposed to the original slurry without having the above neutralizing treatment.

I claim:

1. A process for preparing a sprayable slurry of ferrous sulfate from copperas which comprises forming a water solution of ferrous sulfate saturated with respect to ferrous sulfate monohydrate, and thereafter while maintaining the temperature of said soluton above about 60° C. adding copperas to said saturated solution to form a suspension of ferrous sulfate monohydrate having an overall concentration lying between that of said saturated water solution and the concentration represented by the relationship $FeSO_4:7H_2O$.

2. The process as defined in claim 1 including the step of withdrawing at least a portion of the suspension of ferrous sulfate monohydrate while maintaining the temperature above 60° C., and spray-drying the withdrawn portion.

3. The process as defined in claim 1 wherein portions of said suspension of ferrous sulfate monohydrate are withdrawn from time to time and are subjected to spray-drying, and wherein additional quantities of copperas are added to the remaining portions to maintain a body of suspension.

4. The process as defined in claim 1 wherein the temperature is maintained between 65° and 85° C.

5. The process as defined in claim 1 wherein additional quantities of copperas are added to the suspension of ferrous sulfate monohydrate and the concentration of ferrous sulfate in said suspension is maintained within the range represented by the relationship $FeSO_4:7.0H_2O$ to $FeSO_4:9.0H_2O$.

6. The process as defined in claim 1 wherein the temperature is maintained between about 65° to 85° C. and the concentration of the ferrous sulfate suspension formed by the addition of copperas is within the approximate range represented by the relationship $FeSO_4:7.0H_2O$ to $FeSO_4:16.6H_2O$.

7. A process for preparing a sprayable slurry of ferrous sulfate monohydrate from more highly hydrated ferrous sulfate which comprises forming a solution of ferrous sulfate saturated with respect to ferrous sulfate monohydrate, introducing live steam into the solution to maintain a temperature above 65° C., and adding the more highly hydrated ferrous sulfate to the saturated solution in an amount correlated to the water introduced by the live steam so as to form a suspension of ferrous sulfate monohydrate having an overall concentration lying in the approximate range represented by the relationship $FeSO_4:6.5H_2O$ to $FeSO_4:16.6H_2O$.

8. The process of claim 7 wherein the more highly hydrated ferrous sulfate is copperas.

9. The process of claim 7 wherein the temperature is maintained in the ragne of 65° to 85° C.

10. The process of claim 7 wherein the concentration of the suspension is maintained within the range represented by the relationship $FeSO_4:7.0H_2O$ to $$FeSO_4:9.0H_2O$$

11. The process of claim 7 wherein the suspension is progressively prepared and progressively transferred to a holding station where it is maintained heated by the introduction of live steam.

12. The process of claim 7 comprising the subsequent step of spray-drying the suspension.

13. The process of claim 11 comprising the subsequent step of progressively taking suspension from the holding station and spray-drying it.

14. A process for preparing a slurry of ferrous sulfate monohydrate from relatively highly hydrated solid ferrous sulfate which comprises forming a water solution of ferrous sulfate saturated with respect to ferrous sulfate monohydrate, and thereafter while maintaining the temperature of said solution above about 65° C. adding relatively highly hydrated solid ferrous sulfate to said saturated solution to form a suspension of ferrous sulfate monohydrate having an overall concentration lying in the approximate range represented by the relationship $FeSO_4:6.5H_2O$ to $FeSO_4:16.6H_2O$.

15. The process as defined in claim 14 wherein the suspension, after addition of said relatively highly hydrated ferrous sulfate, is maintained at a temperature between about 65° C. and the boiling point for a minimum time ranging from about six hours at the lower temperature to about one-half hour at the higher temperature to complete the conversion of the highly hydrated ferrous sulfate to ferrous sulfate monohydrate.

16. The process of claim 14 wherein any free acid introduced with the said highly hydrated solid ferrous sulfate is neutralized by the addition of substantially an equivalent amount of alkali.

17. The process of claim 14 wherein the pH of the slurry is adjusted by the addition of an alkali to a pH in the range of about 4 to 5 and the resulting neutralized slurry is subjected to a drying step to produce a relatively free-flowing solid product.

18. The process of claim 16 wherein the preparation of the slurry is carried out under substantially non-oxidizing conditions.

19. The process of claim 18 wherein a non-oxidizing atmosphere is maintained over the surface of the liquid mass during preparation of the slurry.

20. The process of claim 14 wherein the highly hydrated solid ferrous sulfate is copperas containing a small amount of free acid and the ferrous sulfate monohydrate suspension is subjected to a drying operation, and wherein said free acid content is neutralized by the addition of substantially an equivalent amount of alkali and the mass is thereafter maintained under substantially non-oxidizing conditions until the said suspension is dried.

References Cited in the file of this patent

UNITED STATES PATENTS

| 2,005,120 | Whetzel et al. | June 18, 1935 |
| 2,006,693 | Hechenbleikner | July 2, 1935 |
| 2,616,790 | Swindin | Nov. 4, 1952 |